US008413545B1

(12) United States Patent
Reid

(10) Patent No.: US 8,413,545 B1
(45) Date of Patent: Apr. 9, 2013

(54) TRANSMISSION AND TRANSMISSION HOUSING WITH MULTIPLE DIPSTICKS AND DIPSTICK APERTURES, CIRCUMFERENTIALLY POSITIONED INTERNAL LUGS AND AN ADJACENT FLUID INLET PORT

(76) Inventor: Dennis Reid, Pleasant Hill, CA (US)

( * ) Notice: Subject to any disclaimer, the term of this patent is extended or adjusted under 35 U.S.C. 154(b) by 0 days.

(21) Appl. No.: 13/411,723

(22) Filed: Mar. 5, 2012

Related U.S. Application Data

(60) Provisional application No. 61/567,211, filed on Dec. 6, 2011.

(51) Int. Cl.
*F16H 57/02* (2012.01)
*F16H 57/04* (2010.01)
*F16H 61/00* (2006.01)

(52) U.S. Cl. ..................................................... 74/606 R

(58) Field of Classification Search ................ 74/606 R, 74/607, 467; 184/1.5, 7.4
See application file for complete search history.

(56) References Cited

U.S. PATENT DOCUMENTS

| | | | | |
|---|---|---|---|---|
| 2,687,784 | A * | 8/1954 | Klackner | 184/104.1 |
| 2,916,030 | A * | 12/1959 | Hoeth | 123/142.5 E |
| 2,953,939 | A * | 9/1960 | Rains | 74/606 R |
| 4,951,527 | A * | 8/1990 | Klazura | 74/606 R |
| 2007/0000728 | A1* | 1/2007 | Pignard et al. | 184/6.12 |
| 2008/0028888 | A1* | 2/2008 | Lochocki, Jr. | 74/606 R |

OTHER PUBLICATIONS

United Delco, "Dual Path Transmission," Sep. 1962, pp. 5-110.
Sessions, Ron, How to Work with and Modify the Turbo Hydra-Matic 400 Transmission, 1987, p. 35, MBI Publishing Co., Osceola, WI.
MOTOR, "Motor Automatic Transmission Manual-Professional Service Trade Edition," 1982, pp. 1162, 1163, 1189, Hearst Corporation, NY, NY.
Chilton Book Co., "Chilton's Automatic Transmission Manual-Professional Mechanic's Edition," 1980, pp. 1100, 1122, 1132, Chilton Book Co., Radnor, PA.

* cited by examiner

*Primary Examiner* — James Pilkington
*Assistant Examiner* — Derek Brylanski
(74) *Attorney, Agent, or Firm* — Robert L. Wolter, Esq.; Beusse Wolter Sanks Mora & Maire, P.A.

(57) ABSTRACT

A transmission housing, or transmission including a transmission housing, having a plurality of dipstick access ports positioned on the housing for receiving in each access port a dipstick that is used to monitor a level of transmission fluid in an oil pan mounted to a bottom of the transmission housing. The housing may also include internal lugs positioned along an internal surface of the housing that interlock or interconnect with a transmission component to minimize rotational movement of the component relative to the housing. The lugs are aligned and spaced equidistance apart circumferentially on the internal surface of the housing, thereby eliminating larger gaps between consecutive lugs, which may concentrate mechanical stresses on the lugs at such a gap, as in prior art transmission. In addition, the housing may include an inlet fluid port positioned adjacent the lugs for receiving cooled transmission fluid to lubricate and cool centrally and rearwardly positioned transmission components.

19 Claims, 4 Drawing Sheets

TRANSMISSION AND TRANSMISSION HOUSING WITH MULTIPLE DIPSTICKS AND DIPSTICK APERTURES, CIRCUMFERENTIALLY POSITIONED INTERNAL LUGS AND AN ADJACENT FLUID INLET PORT

CROSS-REFERENCE TO RELATED APPLICATIONS

This application claims the benefit of U.S. Provisional Application No. 61/567,211 filed Dec. 6, 2011, and incorporated herein by reference in its entirety.

BACKGROUND OF THE INVENTION

This invention generally relates to transmissions for marine and land vehicles and machines and more particularly to transmission housings used to house the components of transmissions. More specifically, the invention pertains to transmission fluid dipsticks used in connection with a transmission to determine levels of transmission fluid available for operation of the transmission. Another aspect of the invention relates to internal lugs that are circumferentially spaced on an internal surface of the transmission housing for securing in place components of a transmission. In addition, the invention pertains to injection additional cooled transmission fluid into the transmission housing.

Dipsticks for Transmission Housings

Automatic transmissions comprise a series of gears, shafts, clutches, valves and hydraulic controls housed within a transmission housing or casing. The transmission is connected at its front end to an engine crankshaft and flexplate via a torque converter. At its back end, the transmission is connected to an output shaft, which transmits rotary power generated by the engine and transmission to wheel axles, via a universal joint, in the case of an automobile transmission. Such similar transmission arrangements are available for marine vehicles and machinery that include transmissions in combination with engines to generate rotary power.

In such transmissions, an oil pan is mounted and sealed to a bottom of the housing, and provides a reservoir for automatic transmission fluid used to operate the transmission. An oil pump, which is typically positioned toward a front of the transmission housing, is in fluid communication with the oil pan and an interior of the housing via a series of fluidic channels and one or more valve bodies. The oil pump supplies the transmission fluid (oil) under pressure to actuate the various clutches inside the housing in order to transmit power from the engine to the axles and wheels.

To insure that a sufficient amount of transmission fluid is present in the transmission oil pan, the transmission includes a fluid level detection device that is manually inserted either through the transmission housing or the oil pan to detect a level of transmission fluid in the oil pan. The most commonly used device is a dipstick, which is inserted through an access port disposed on a side of the transmission housing and extends into the oil pan. Such a dipstick includes a handle fixed to a thin metal strip that has been stamped with fluid level markings. The metal strip passes through the access port, which includes a raised aperture on the housing and a guide tube positioned at the aperture and fixed to the transmission housing. As indicated above, the access port is typically positioned on a side of the housing (for an automobile, that is the passenger side or driver side) and the dipstick is long enough to allow the top of the dipstick to be positioned at a location that is accessible by hand and convenient for checking.

A less common placement of the dipstick is at the oil pan instead of dipstick passing through the transmission housing. In order to obtain an accurate reading of the transmission fluid level the access port is positioned relatively low on the oil pan. This leaves the dipstick vulnerable to damage as the bottom of the vehicle is exposed and unprotected to road debris. The dipstick and or guide tube can easily snag road debris and become dislodged or ripped from the access port, which then drains the transmission fluid from the oil pan, potentially causing catastrophic failure of the transmission. When the dipstick tube is installed in the transmission housing, it is in a protected area that lies between the transmission housing and the floorboard/firewall of the vehicle so damage from road debris rarely occurs.

Another reason tubes are rarely attached to the oil pan involves servicing of the transmission. Transmissions are serviced (maintained) by removing the oil pan, cleaning and flushing the inside of the transmission, and then changing the oil filter. When the guide tube is attached to the oil pan, the oil pan cannot be easily removed because the dipstick and/or the guide tube hangs up or attaches to parts or areas in the engine compartment. This makes servicing more difficult and time consuming. Conversely, the dipstick and guide tube do not have to be removed during services when attached to the transmission housing; and, a technician simply unbolts and removes the oil pan to perform the required maintenance. Accordingly, the dipstick has been predominantly and traditionally positioned along one of the two sides (primarily the passenger side) of the transmission housing.

However, this traditional placement of the dipstick is not without some shortcomings. More specifically, in competitive or modified vehicles that incorporate original equipment manufacturer (OEM) transmissions, the position of the transmission and transmission housing relative to the engine, engine compartment and/or firewall may be different as compared to OEM vehicles for which the OEM transmission was designed. In addition, after market manufacturers of transmission housings that are used in competitive and modified vehicles generally follow the OEM specifications of the transmission housings and have maintained the traditional placement of the dipstick and guide tube on the passenger side of a vehicle. Accordingly, access to the dipstick may be compromised and difficult to reach.

Internal Lugs for Transmission Housings

The Hydra-Matic 400 transmission, manufactured by General Motors®, and its transmission housing are oftentimes used in competitive vehicles, for example, drag racing vehicles and off-road desert racing vehicles. The transmission housing includes lugs (also sometimes referred to as splines or teeth) that are spaced apart equidistance on an internal surface of the housing. These lugs interconnect with lugs of a transmission component to minimize rotational movement of the component relative to the transmission housing.

While the lugs on the housing are spaced generally circumferentially on the internal surface of the housing, the lugs do not expand the entire internal circumference of the housing. That is, a gap is disposed between two end lugs wherein the gap is larger than the spacing between consecutive lugs. This gap is represented by the square 40 shown in FIG. 5, which is a drawing of the subject invention including lugs at the location of the gap. This gap was provided for ease and speed of manufacturing of the transmission.

A pocket (shown in FIG. 5) is formed in the internal surface of the housing adjacent the lugs to support a component of the transmission housing adjacent to the set of lugs and the gap. During the course of manufacturing of the prior art Hydra-Matic 400 transmission housing, a core or plug is fixed relative to an external mold. This plug includes various projections, protrusions, recesses, voids, channels, etc., representing structural features of the housing that are positioned in mating relationship with matching features on the external mold. The external mold surrounds the plug to form the housing. After the housing is formed between the external mold and the plug, the external mold is removed. A protrusion forming the pocket actually extends forward to an end of the plug so the pocket on the housing extends to the end of the housing. In this manner, the plug can be removed from the formed transmission housing. However, if lugs were formed in the gap, the lugs would block the protrusion on the plug forming the pocket and the plug could not be removed. Accordingly, additional steps in the manufacturing process would be required if lugs were to be formed at the gap.

It is known that, at least with respect to the use of this transmission housing in competitive vehicles as described above, the existence of the gap compromises the structural integrity of the transmission housing. A snap ring is disposed within a slot aligned in each of the lugs, and moving transmission components bump or push against the support ring causing mechanical stress on the lugs. Two end lugs at the gap absorb additional stresses in the absence of the lugs at the gap. As the end lugs at the gap are exposed to additional stresses, they tend to crack or break first, especially in the above-described competitive vehicles. When the end lugs crack or break off this causes what may be characterized as a chain reaction, in which the next consecutive lug eventually breaks and so on until a sufficient number of lugs break destroying the locking interconnection between the transmission and the transmission housing.

As this problem with the Hydra-Matic 400 transmission is well-known to those skilled in the art, some after-market parts manufacturers make and sell parts such as intermediate tabs, supports or plates that are fixed to the internal surface at the gap between the two end lugs. This additional part better distributes the stresses along the lugs to prevent the lugs from breaking. Moreover, not all transmission housings include the above-described gap between the two end lugs. For example, the transmission housings for an Allison AT542 transmission, which have been manufactured at least as early as 1980, include lugs that are spaced equidistance apart and are positioned circumferentially 360° along an interior surface of the housing, and does not include the above-described gap. However, the transmission housing for the AT542, or any other transmission housing designed specifically for another transmission, obviously will not fit a Hydra-Matic 400 automatic transmission, which is an extremely popular transmission for competitive racing and off-road vehicles.

Injection of Cooled Transmission Fluid into Housing

Under extreme conditions, gear train parts of a transmission must transmit higher levels of power thru the transmission. The higher power levels result in more forces being applied to the various gear train parts. Higher forces create more load and friction on the parts. This breaks down the transmission fluid or lubricating oil causing great wear or galling of the parts eventually leading to failure. The loading caused friction also heats up the parts, which breaks down the lubricating properties of the transmission fluid thereby creating even more wear, heating, and friction in an endless downward spiral until the entire transmission fails.

In the OEM transmission applications, oiling and cooling is accomplished by taking pressurized transmission fluid from the torque converter and sending it out to an external cooler via a hose connected to a fitting on the side of the transmission housing. The transmission fluid returns from the cooler in a much cooler state and is injected back into the transmission case via a second hose and fitting in the side of the transmission case that is located near the first fitting and hose toward a front of the housing. This cooled transmission fluid is conducted thru the shafts and gears throughout the gear train. It eventually is sprayed out thru openings in the shafts, gears, clutches and drums and it drains down into the oil pan at the bottom of the transmission. This transmission fluid cools and lubricates the various parts inside the transmission and works adequately under normal transmission use.

In severe duty applications, not enough oil reaches the rear of the gear train to cool and lubricate the parts, because the cooled transmission fluid is introduced toward the front of the housing. General Motors® recognized this problem and in a next generation of transmissions called the 4L80E that succeeded the Hydra-Matic 400, the location of the return oil line was moved to a more central location. The intermediate (sometimes called the center) support housing which is the part that mates to the above-mentioned lugs inside the transmission case, has an additional oil passageway present that allows oil to be transmitted from the outside of the case to the inside gear train section. The 4L80E transmission has been manufactured since the 1990's.

In a effort to make the Hydra-Matic 400 live longer under extreme conditions, it is well-known in the industry (particularly the off-road racing industry) that an additional external oil cooling line may be plumbed into the intermediate support housing. Two companies that have been making this modification to the Hydra-Matic 400 for many years are Rancho Drivetrain Engineering in Temecula, Calif., and Gearworks in Las Vegas, Nev. This is accomplished by drilling and threading the additional oil hole duplicating the 4L80E arrangement. One shortcoming with this procedure is that the casting is very thin where the additional oil fitting is added, so care must be used in installing and properly supporting the extra oil line.

BRIEF DESCRIPTION OF THE INVENTION

Accordingly, a feature of the present invention is to include with a transmission housing, or transmission including a transmission housing, a plurality of dipstick access ports positioned on the housing for receiving in each access port a dipstick that is used to monitor a level of transmission fluid in an oil pan mounted to a bottom of the transmission housing. The oil pan holds the transmission fluid that is deliverable under pressure for actuation of one or more of transmission components encased within the housing. The feature of multiple dipstick access ports may be especially beneficial for transmissions used in racing vehicles that include transmissions that are positioned relative to an engine that may make a single dipstick and access port inaccessible.

Another feature of the invention includes the positioning of internal lugs along an internal surface of the housing that interlock or interconnect with a transmission component to minimize rotational movement of the component relative to the housing. The lugs are aligned and spaced equidistance apart circumferentially on the internal surface of the housing, thereby eliminating larger gaps between consecutive lugs, which may concentrate mechanical stresses on the lugs at such a gap, as in prior art transmission. Also, the additional lugs eliminate the need for after-market parts that are mounted to the housing to compensate for the absence of lugs.

Yet another feature of the invention includes positioning a fluid inlet port in the housing adjacent the location of the internal lugs. Transmission fluid drawn from a torque converter or a front of the transmission is directed to a cooler via a line and the cooled transmission fluid is injected into the housing through the fluid injection port positioned adjacent the internal lugs. In an embodiment, the fluid injection port includes a raised boss to support a fitting for attachment of the fluid line. In this manner, cooled transmission fluid may be injected into the housing to both cool and lubricate transmission components centrally and rearwardly located in the transmission.

BRIEF DESCRIPTION OF THE DRAWINGS

A more particular description of the invention briefly described above will be rendered by reference to specific embodiments thereof that are illustrated in the appended drawings. Understanding that these drawings depict only typical embodiments of the invention and are not therefore to be considered to be limiting of its scope, the invention will be describe and explained with additional specificity and detail through the use of the accompanying drawings.

DETAILED DESCRIPTION OF THE INVENTION

Figure 1:
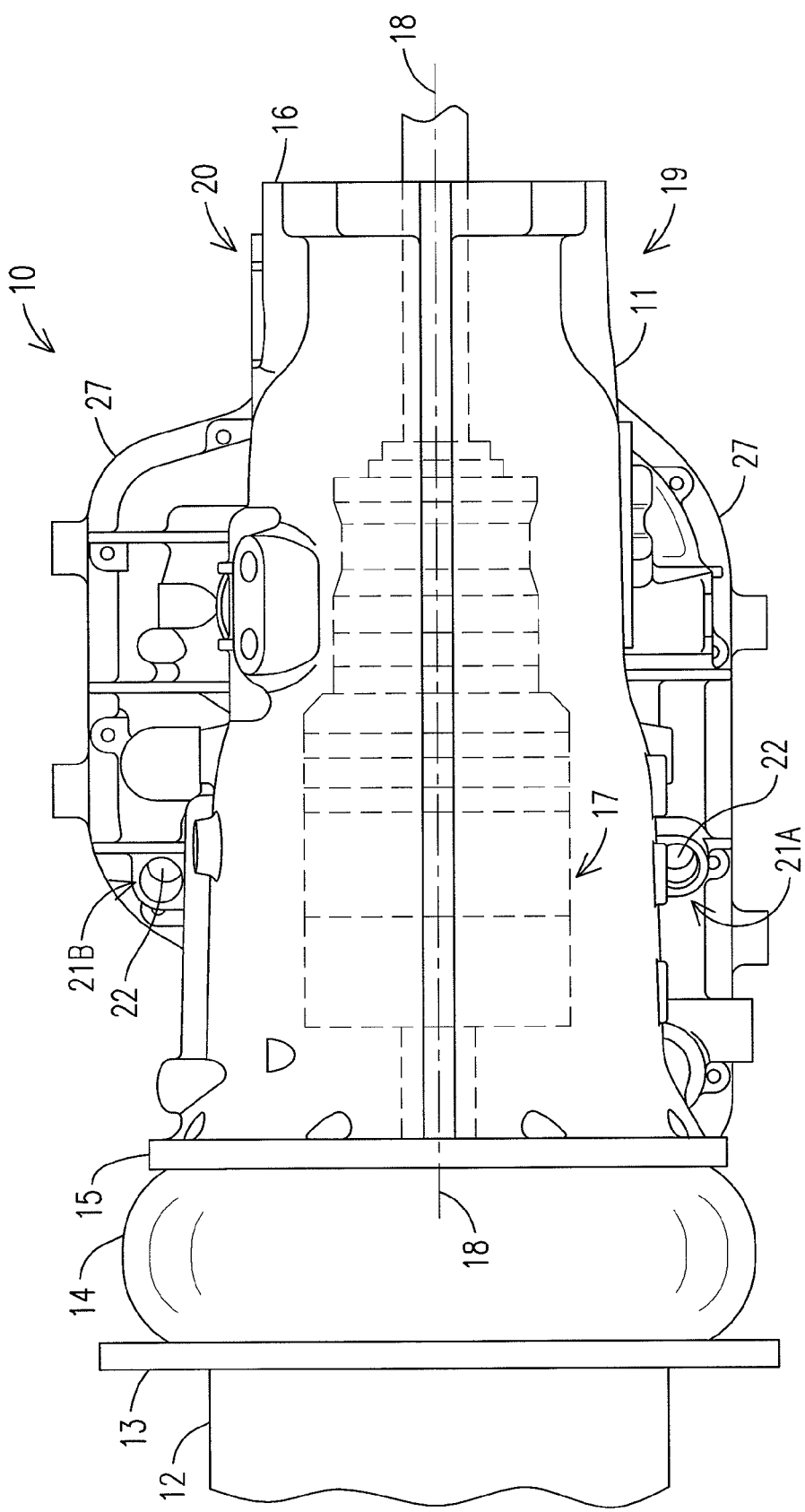
FIG. 1 is a top view of a transmission housing with a plurality of dipstick access ports.

Reference will now be made in detail to the embodiments consistent with the invention, examples of which are illustrated in the accompanying drawings. Wherever possible, the same reference numerals are used throughout the drawings and refer to the same or like parts.

With respect to FIG. 1, a transmission 10 is shown including a transmission housing 11 with its front end 15 connected to an engine 12 via a torque converter 14 and flexplate 13. The transmission 10 includes the housing 11 and transmission components 17 (schematically shown), such as gears, clutches, shafts, valve bodies, etc., which are encased within the housing 10 and transmit rotary power generated by the engine 12 to an output shaft and an axle (not shown).

Figure 2:
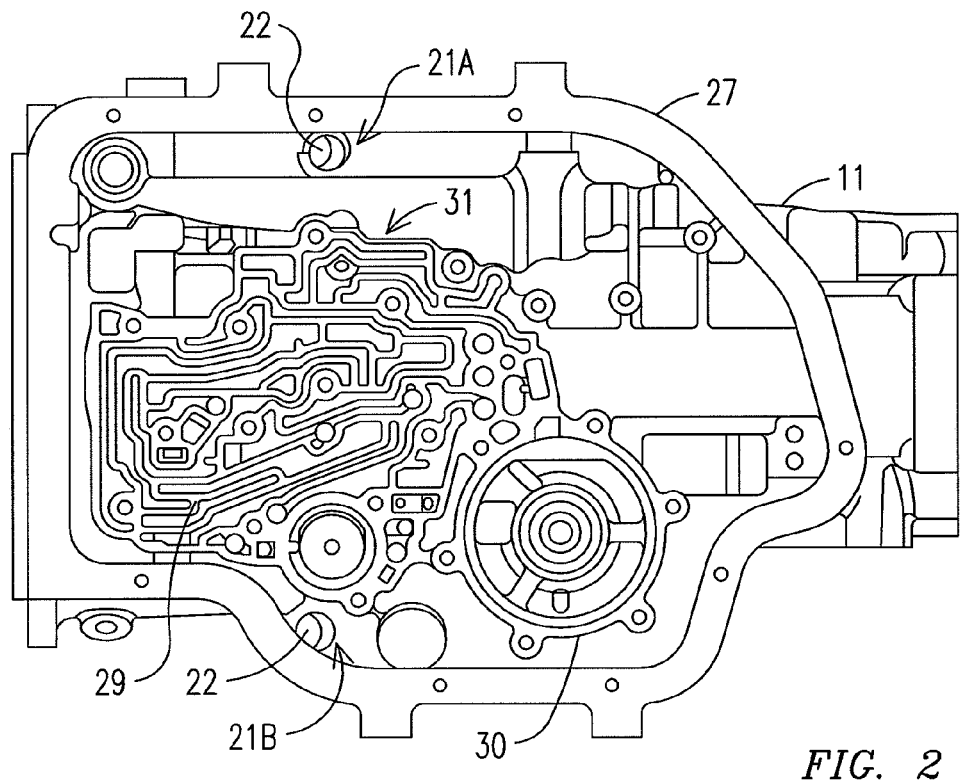
FIG. 2 is a bottom partial sectional view of the transmission housing with an oil pan being removed to view the multiple dipstick access ports.
Figure 3:
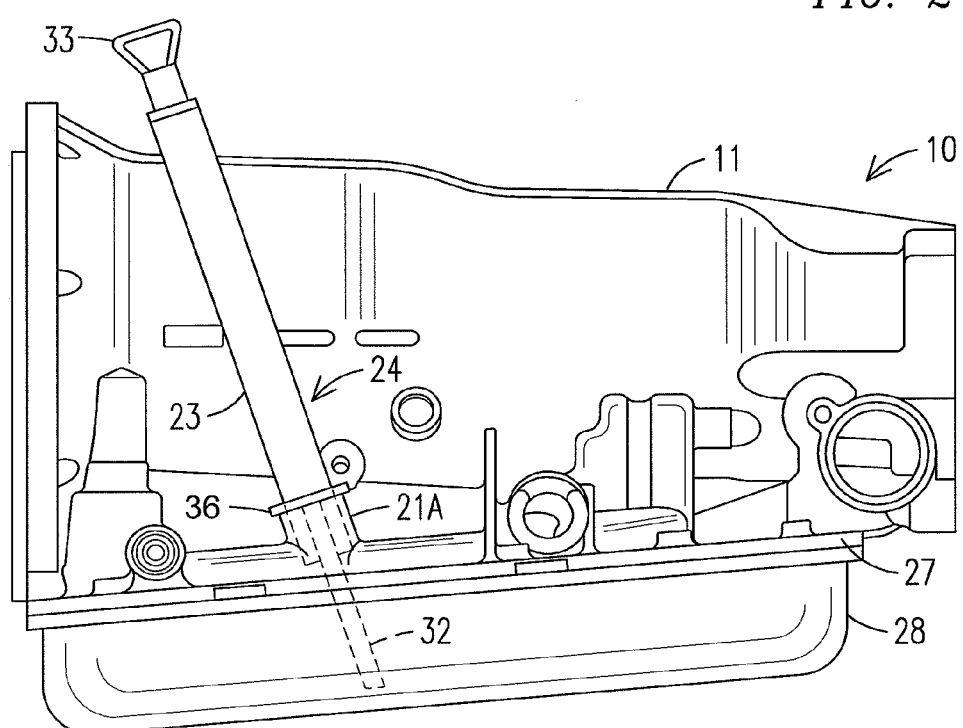
FIG. 3 is a side view of the transmission housing with an oil pan attached and the dipstick and guide tube shown.
Figure 4:
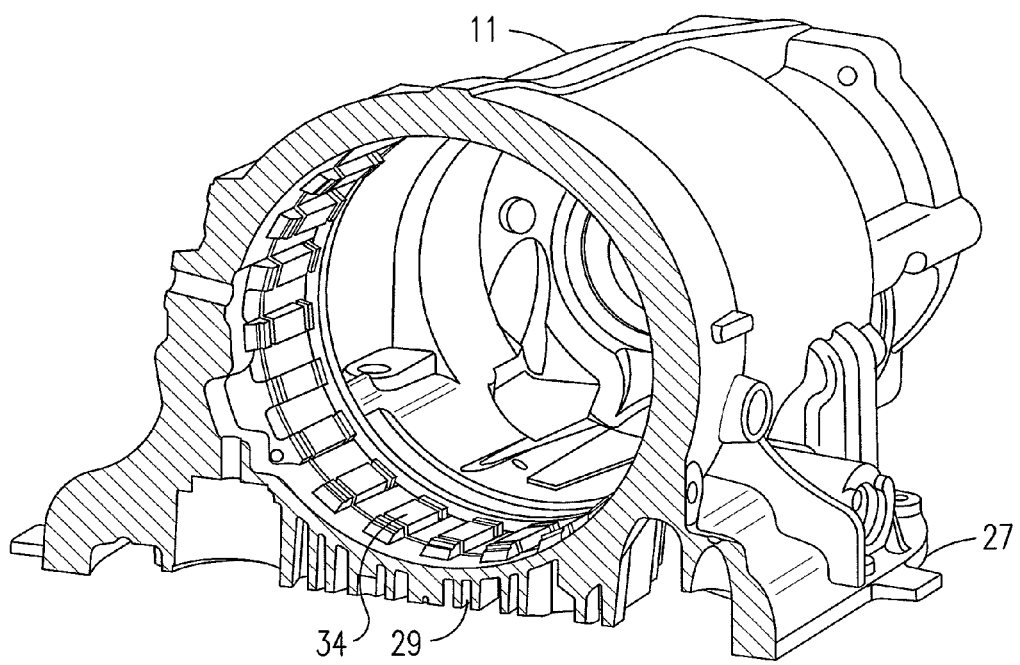
FIG. 4 is a first sectional view of the transmission housing illustrating the internal lugs.
Figure 5:
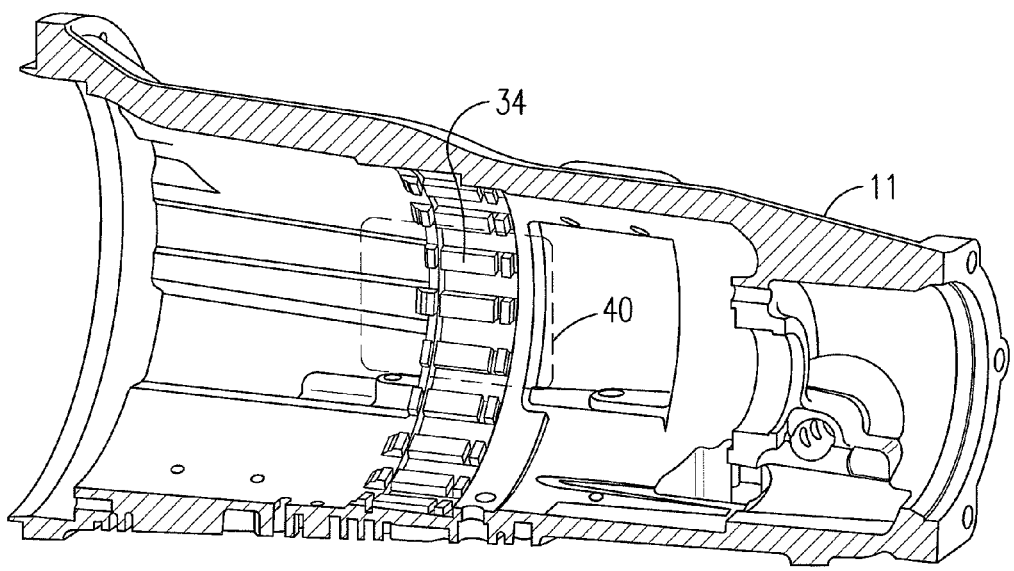
FIG. 5 is a second sectional view of the transmission housing illustrating the internal lugs.

As shown in FIG. 3, an oil pan 28 is mounted to a bottom of the transmission housing 11. More specifically, the housing 11 includes a flange 27 at a bottom of the housing 11; and, the oil pan 28 includes a matching flange that is bolted to the flange 27 of the housing 11. As in conventional transmissions, the oil pan 28 serves as a reservoir for transmission fluid. To that end an oil pump (not shown) may be provided to transfer transmission fluid under pressure from the oil pan 28 through fluidic channels 29 and valves to actuate components (clutches) of the transmission 10. In FIG. 2, a portion of the transmission fluid control assembly 31 is removed showing the fluidic channels 29 and mounts 30 for valve bodies.

As shown in FIGS. 1 and 2, the housing 11 includes a plurality of dipstick access ports 21A, 21B. In a preferred embodiment, a plurality of dipsticks 24 may be used wherein each dipstick 24 is inserted into a corresponding access port 21A, 21B. Each access port 21A, 21B includes an aperture 22 and a guide tube 23, through which the dipstick 24 is inserted. As known to those skilled in the art, the guide tube 23 includes a collar 36 such that when the tube 23 is inserted into the aperture 22, the guide tube 23 is positioned in sealing relationship with the aperture to prevent leakage of transmission fluid from the housing 11 or oil pan 28.

In addition, the dipstick 24 is of a conventional design including an elongated metal strip 32 with stamped markings for measuring a level of transmission fluid in the oil pan 28. The dipstick also includes a handle 33 for grasping the dipstick 24 when inserting or removing the dipstick 24. Although it is preferred, a dipstick 24 is not required for each access port 23. As described below, when the transmission 10 with the housing is installed one of the access ports 21A or 21B that is more accessible than the other may be selected as a preferred access port for a dipstick 24, and the other access port 21A or 21B may be sealed shut to avoid leakage of transmission fluid.

In the embodiment illustrated in FIGS. 1-3, and described herein, the housing 11 includes two access ports 21A, 21B; however, the invention is not so limited and may include more than two access ports. As shown, the dashed line 18 represents a centerline of the housing 11 thereby dividing the transmission longitudinally wherein the housing 11 includes a first side 19 and a second side 20. Accordingly, one access port 21A is on a first side 19 and the other access port 21B is on the second side 20 of the transmission housing 11. However, the access ports 21A and 21B do not have to be positioned on opposite sides of the housing 11, and may be positioned on the same side of the housing 11.

The above-described housing 11 may be incorporated with a transmission 10 that is used in a competitive racing vehicle, such as a drag racing or off-road desert racing vehicle. Similarly, the housing 11 may be equipped for a marine racing vehicle. In such vehicles, the engine and other parts may require positioning the transmission 10 and housing 11 within the vehicle frame such that the conventional position of a dipstick 24 and access port 21B, on the passenger side (second side 20) of the vehicle, is not readily accessible. Accordingly, the present invention for the transmission 10 and transmission housing 11 having multiple dipstick access ports 21A, 21B provides multiple areas of access to a dipstick to monitor transmission fluid levels that may not otherwise be available for a transmission that includes only a single dipstick access port.

In addition to the above-described multiple dipstick access ports 21A, 21B the transmission housing 11 includes internal lugs 34 positioned on an internal surface of the housing 11. These lugs 34 interface or interlock with one or more components of the transmission to minimize rotational movement of the component relative to the housing. For certain transmissions, such as the Hydra-Matic 400 manufactured by General Motors®, the transmission housings included a gap between two end lugs. As described above, this gap was generally the vestige of a manufacturing/molding process; however, the existence of the gap compromised the structural integrity of the lugs 34 and housing 11.

Accordingly, with respect to an embodiment of the present invention, the transmission housing includes lugs 34 positioned at the location of previously described gap. That is, the lugs 34 are positioned circumferentially along an internal surface of the housing 11, spaced equidistance apart from one another and are aligned side by side. Thus, the above-described gap is eliminated whereby the spacing between adjacent lugs 34 is substantially equal along an internal circumference of the housing 11. For example, a transmission housing 11 manufactured to fit a Hydra-Matic 400 transmission may include twenty-two lugs that are each ½" wide, and adjacent lugs are spaced apart ½". In addition, the lugs 34 are each about 2" long, including a ¼" long lip forming a slot for inserting a snap ring. By including the additional lugs 34 at the gap, the mechanical stresses on the lugs from operation of the transmission is more evenly distributed among the lugs 34 as opposed to concentrating some stresses on a few of the lugs 34. Accordingly, the structural integrity of the housing 11 is not compromised as in the above-described prior art housings. The transmission housing 11 is manufactured using known molding techniques and materials such as a cast aluminum alloy.

Figure 6:
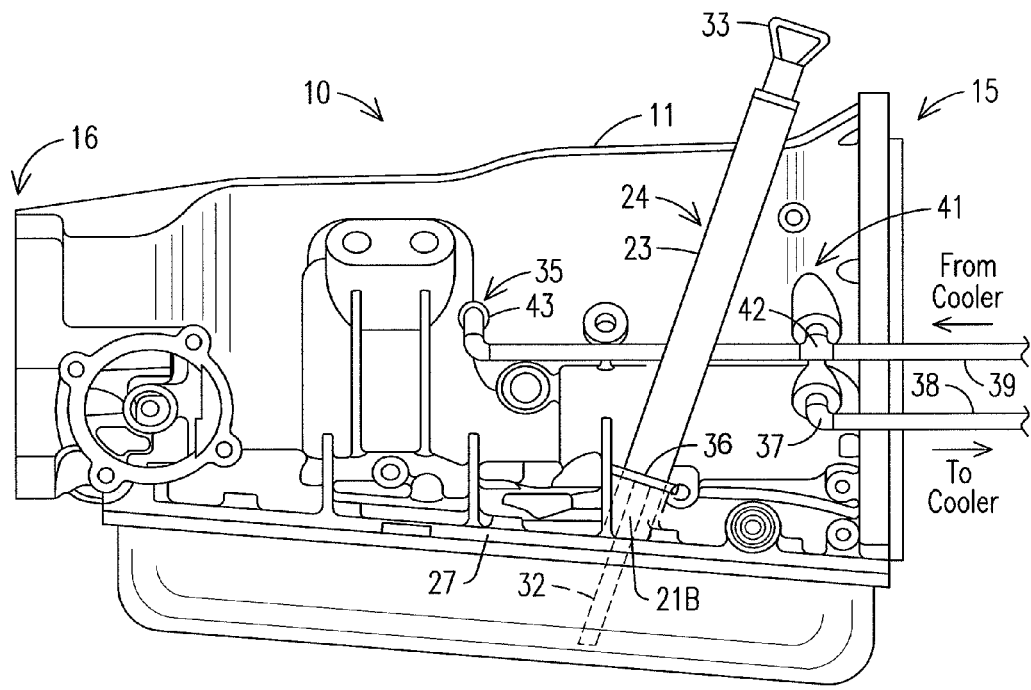
FIG. 6 is a side view of the transmission housing illustrating a fluid exit port and two fluid inlet ports and corresponding fluid lines, with one of the fluid inlet ports positioned adjacent the internal lugs.
Figure 7:
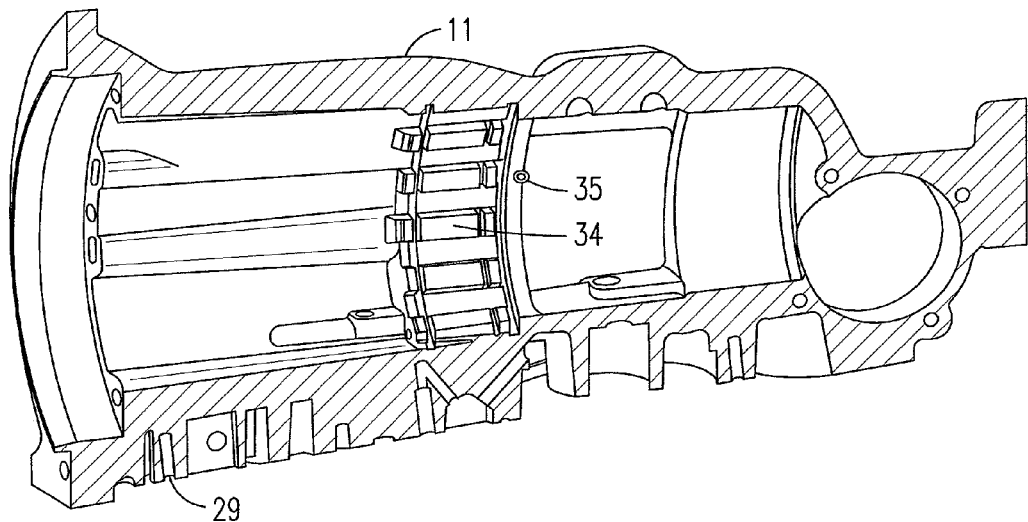
FIG. 7 is an internal sectional view of the transmission housing including a fluid inlet port adjacent the internal lugs.

In reference to FIGS. 6 and 7, in addition to the above-described multiple dipstick ports 21A, 21B and internal lugs 34, the transmission housing 11 may include a fluid inlet port 35 (second inlet port) toward the rear end 16 of the housing 11 and adjacent to the internal lugs 34 for injection of cooled transmission fluid into the housing to cool and lubricate transmission components. The internal sectional view shown in FIG. 7 illustrates the positioning of the second inlet port 35 adjacent to the lugs 34.

As shown in FIG. 6, the housing 11 includes a fluid outlet port 37 positioned at the front end 15 of the housing and a corresponding outlet line 38 that directs transmission fluid from an interior of the housing 11 to an external cooler for cooling the hot transmission fluid. An inlet line 39 circulates the cooled transmission fluid from the cooler to a first inlet port 41 that is adjacent to the outlet port 37 at the front end 15 of the housing 11.

As illustrated in FIG. 6, a T-fitting 42 at the first inlet port 41 allows the inlet line 39 to continue to the second inlet port 35 so cooled transmission fluid can be injected at a central location of the housing adjacent the internal lugs 34. However, a t-fitting is not required at the first inlet port 41 to circulate the cooled transmission fluid both inlet ports 35, 41. For example, the t-fitting 42 may be positioned upstream along the line 39 toward the cooler to split the line 39 for injection in both ports 35, 41, or other plumbing configurations may be used to direct cooled transmission fluid to both inlet ports 35, 41.

As described above, the original OEM design Hydra-Matic 400 transmission housings included a fluid outlet port at the front end of the housing, a fluid inlet port adjacent to the outlet port and corresponding lines to circulate transmission fluid past or through a cooler for introduction of cooled transmission fluid into the transmission. As also described, for competitive racing, especially off-road racing vehicles, it is known that these OEM housings are modified to include a second inlet port that is generally centrally located on a side of the housing, or adjacent a set of internal lugs. However, the OEM castings are very thin at this location of the additional fitting, so care must be used in installing and properly supporting the extra oil line.

Accordingly, in an embodiment of the invention the second inlet port 35 includes a raised boss 43. By way of example the boss 43 may protrude out of an outer wall of the housing about ½ inch and is of sufficient diameter to allow the machining and thru drilled hole to the inside of the housing, as well as supporting a fitting to attach line 39 to the second inlet portal 35. Thus, an embodiment of the subject invention may include the above-described mechanism for introducing cooled transmission fluid into an interior of the housing to cool and lubricate transmission components adjacent to the internal lugs to cool and lubricate centrally and rearwardly located transmission components.

While the preferred embodiments of the present invention have been shown and described herein, it will be obvious that such embodiments are provided by way of example only and not of limitation. Numerous variations, changes and substitutions will occur to those skilled in the art without departing from the teaching of the present invention. Accordingly, it is intended that the invention be interpreted within the full spirit and scope of the appended claims.

The invention claimed is:

1. A transmission assembly comprising:
 a single transmission housing having an interior in which a plurality of transmission components are capable of being positioned;
 a single oil pan mounted to a bottom of the single transmission housing for holding a transmission fluid that is deliverable under pressure to the interior of the housing; and
 a plurality of dipstick access ports positioned on the single transmission housing for receiving in each access port a dipstick that is used to monitor a level of the transmission fluid in the single oil pan.

2. The transmission assembly of claim 1, wherein the housing includes a centerline coextensive with a longitudinal axis of the housing dividing the housing into a first side and a second side wherein at least one dipstick access port is on the first side and at least one dipstick access port is on the second side.

3. The transmission assembly of claim 1, wherein the housing includes a centerline coextensive with a longitudinal axis of the housing dividing the housing into a first side and a second side wherein the plurality of dipstick access ports are on either the first side or the second side.

4. The transmission assembly of claim 1, further comprising at least one dipstick inserted through a corresponding access port.

5. The transmission assembly of claim 1, further comprising a flange positioned toward the bottom of the housing and the oil pan is mounted to the flange, wherein each of the plurality of dipstick access ports is positioned on the flange.

6. The transmission assembly of claim 5, wherein the housing has a generally cylindrical shape and a plurality of lugs are positioned on an internal surface of the housing spaced equidistance apart from one another, aligned with each other and are disposed circumferentially along the internal surface of the housing.

7. The transmission assembly of claim 6, further comprising an outlet transmission fluid port and line through which transmission fluid from the interior of the housing to a cooler via the outlet line, and an inlet transmission fluid port and line through which cooled transmission fluid passes into the interior of the transmission housing to cool and lubricate transmission components, wherein the inlet transmission port is positioned adjacent to the internal lugs.

8. The transmission assembly of claim 7, wherein the inlet transmission fluid port positioned adjacent the internal lugs is a first inlet port and the housing further comprises a first transmission inlet port adjacent to the outlet transmission fluid port at a front end of the transmission housing.

9. The transmission assembly of claim 7, wherein the inlet transmission fluid port includes an externally protruding boss for supporting a fitting and attachment of inlet transmission fluid line.

10. The transmission assembly of claim 1, wherein the plurality of dipstick access ports include at least two dipstick access ports for the single oil pan in the transmission housing.

11. The transmission assembly of claim 1, wherein the single oil pan is mounted to the bottom of the single transmission housing based on a flange at the bottom of the single transmission housing being bolted to a matching flange of the single oil pan.

12. A transmission connected to a crankshaft of an engine for transmitting a rotational power output generated by the engine to an axle, the transmission comprising:
 a single transmission housing having an interior in which transmission components are positioned;
 a single oil pan mounted to a bottom of the single transmission housing for holding a transmission fluid that is deliverable under pressure for actuation of one or more transmission components;
 a plurality of dipstick access ports positioned on the single transmission housing; and,
 a plurality of dipsticks wherein each dipstick is inserted into a corresponding dipstick access port and partially submersed in the transmission fluid for monitoring levels of the transmission fluid.

13. The transmission of claim 10, wherein the single transmission housing includes a centerline coextensive with a longitudinal axis of the housing dividing the housing into a first side and a second side wherein at least one dipstick access port is on the first side and at least one dipstick access port is on the second side.

14. The transmission of claim 10, further comprising a flange positioned toward the bottom of the housing and the oil pan is mounted to the flange, wherein each of the plurality of dipstick access ports is positioned on the flange.

15. The transmission of claim 10, wherein the housing has a generally cylindrical shape and a plurality of lugs are positioned on an internal surface of the housing spaced equidistance apart from one another, aligned with each other and are disposed circumferentially along the internal surface of the housing.

16. The transmission of claim 14, further comprising an outlet transmission fluid port and line through which transmission fluid from the interior of the housing to a radiator via the outlet line, and an inlet transmission fluid port and line through which cooled transmission fluid passes into the interior of the transmission housing to cool and lubricate transmission components.

17. The transmission housing of claim 15, wherein the inlet transmission fluid port positioned adjacent the internal lugs is a first inlet port and the housing further comprises a first transmission inlet port adjacent to the outlet transmission fluid port at a front end of the transmission housing.

18. The transmission housing of claim 15, wherein the inlet transmission fluid port includes an externally protruding boss for supporting a fitting and attachment of inlet transmission fluid line.

19. The transmission of claim 10, wherein at least one of the dipsticks is inserted through at least one of the plurality of dipstick access ports and wherein at least one of the dipsticks is not inserted through at least one of the plurality of access ports that is sealed shut.

* * * * *